Figure 1:
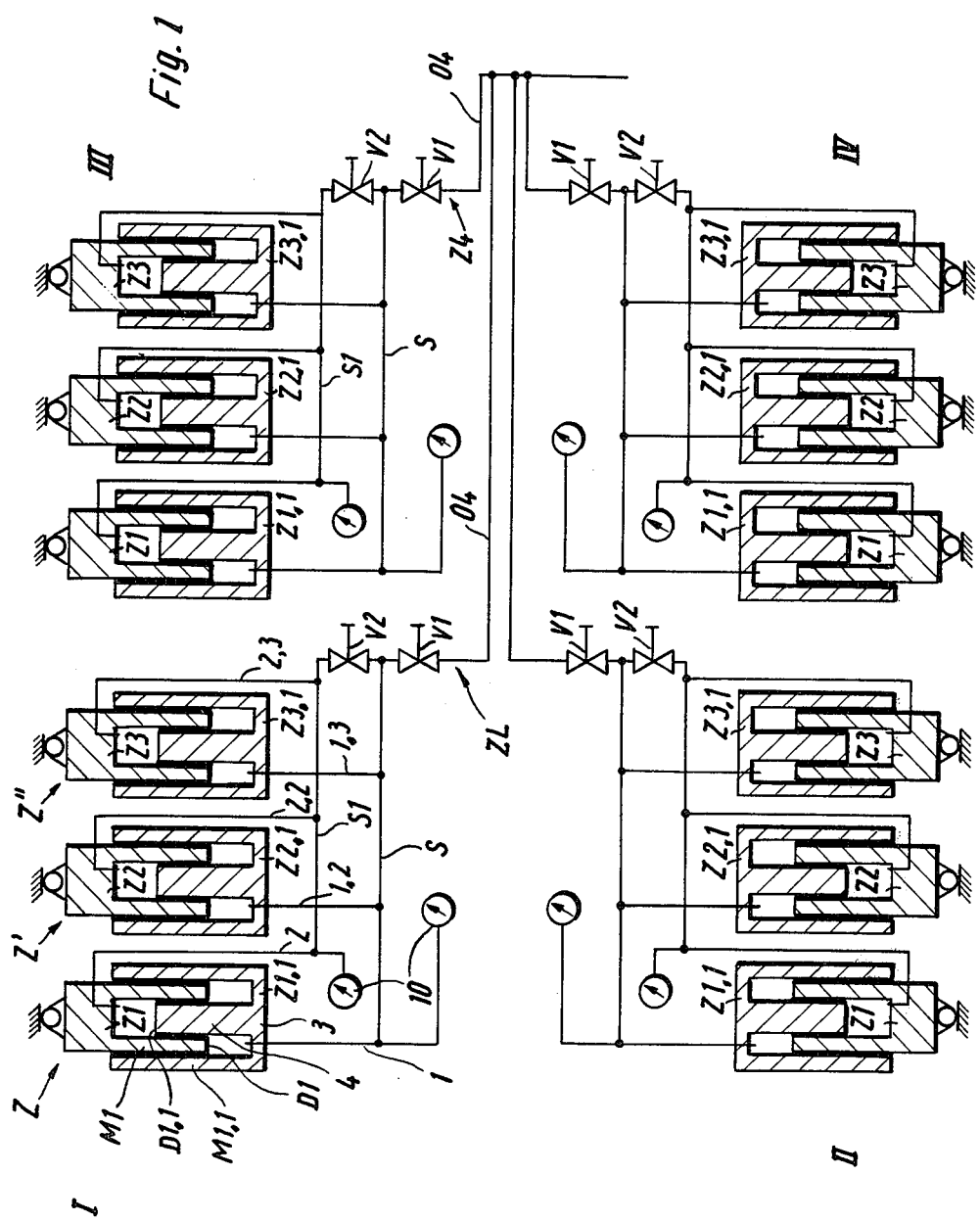

United States Patent [19]

Thiele

[11] 4,277,086
[45] Jul. 7, 1981

[54] HYDRAULIC DAMPER SYSTEM

[76] Inventor: Horst Thiele, Friedhofstrasse 12, D-7106 Neuenstadt, Fed. Rep. of Germany

[21] Appl. No.: 62,229

[22] Filed: Jul. 30, 1979

[30] Foreign Application Priority Data

Nov. 28, 1978 [DE] Fed. Rep. of Germany ....... 2851324

[51] Int. Cl.³ .............................................. B60G 19/06
[52] U.S. Cl. .................................. 280/709; 267/65 D; 280/689
[58] Field of Search ............ 267/DIG. 1, 64 A, 65 R, 267/64 R, 65 D; 296/35.1; 280/702, 709, 689

[56] References Cited

U.S. PATENT DOCUMENTS

| 3,181,877 | 5/1965 | McHenry | 267/DIG. 1 |
| 3,356,954 | 12/1967 | Gottschalk | 280/709 X |

*Primary Examiner*—Douglas C. Butler
*Attorney, Agent, or Firm*—Kurt Kelman

[57] ABSTRACT

A hydraulic damper system comprises a pair of cooperating cylinders. Each cylinder has a piston with a pressure face and the pressure faces of the pistons have substantially the same area. Each piston pressure face delimits an operating chamber in the respective cylinder. A separate hydraulic fluid delivery conduit is connected to the operating chamber of each cylinder and a shut-off valve is mounted in each conduit for selectively discontinuing hydraulic fluid delivery to the operating chambers and permitting hydraulic fluid delivery thereto.

3 Claims, 3 Drawing Figures

HYDRAULIC DAMPER SYSTEM

The present invention relates to improvements in a hydraulic damper system, and more particularly to a support and safety arrangement for such a damper system which may include any number of such pairs of cooperating cylinders.

Hydraulic damper systems are used, for example, in elongated trailer trucks in which the trailer is mounted on a plurality of axles each of which is equipped with a hydraulic damper system for uniformly distributing the load over the wheels on which the trailer moves along the road. Such damper systems usually comprise groups of hydraulic cylinders to which hydraulic fluid, for example oil, is delivered from an oil sump. If the hydraulic fluid conduit and/or one of the cylinders bursts or develops a leak, the entire system collapses. To avoid this, various safety valves have been developed but the fundamental structure of the conventional damper system is such that the safety devices end at the cylinder.

It is the primary object of this invention to provide a support and safety arrangement for a hydraulic damper system, which does not require any special safety valves operable in case of a break or leakage in the system and which, therefore, assures optimal support in such emergencies.

This and other objects are accomplished according to the invention with a support and safety arrangement for a hydraulic damper system comprising a pair of cooperating cylinders, each cylinder having a piston with a pressure face, the pressure face having substantially the same area and each pressure face delimiting an operating chamber in the respective cylinder. A separate hydraulic fluid delivery conduit is connected to the operating chamber of each cylinder and a shut-off valve in each delivery conduit selectively discontinues hydraulic fluid delivery to the operating chambers and permits hydraulic fluid delivery thereto.

Such a system dispenses with safety valves which conventionally have been constituted by slide valves moved into opposite direction on loss of hydraulic fluid to shut off the respective hydraulic fluid conduit. The present system is a true two-conduit circuit connected to the two operating chambers to provide optimum load equalization by the operation of the two cooperating cylinders. This assures the safe support and maintenance of an equilibrium during the transport of heavy loads. In view of the same lifting stroke for each cylinder of the pair, there is no pressure differential on the pressure faces. Only if there is a leakage or break causing a pressure loss in the operating chamber of one cylinder, the pressure face of the other cylinder takes up the entire load by a corresponding increase in the pressure in this cylinder. Such a safe and dependable support and safety arrangement for a hydraulic damper system will have wide utility.

Figures 2, 3:
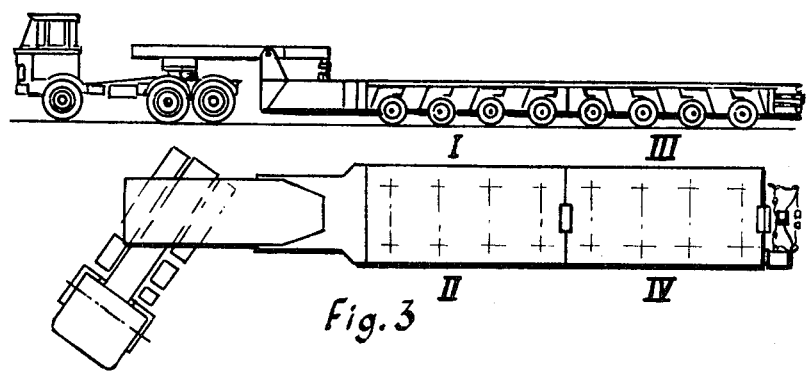

The above and other objects, advantages and features of the present invention will become more apparent in the following description of a now preferred embodiment thereof, taken in conjunction with the accompanying drawing wherein FIG. 1 is a schematic illustration of a hydraulic damper system according to this invention, showing three pairs of cooperating cylinders for each of four axle systems of a trailer, the cylinder being illustrated in axial section;

FIG. 2 is a schematic side view of a tractor-trailer truck wherein the trailer is supported on four axle systems or trucks; and FIG. 3 is a top view of FIG. 2, schematically showing the arrangement of the four hydraulic damper systems.

Referring now to the drawing, each axle system I, II, III and IV is shown to have a hydraulic damper system comprising three pairs Z, Z' and Z'' of cooperating cylinders assembled into a unit. However, if desired, only a single pair of cooperating cylinders may be associated with each axle system and, similarly, more than three pairs of cylinders may be assembled into a unit. The units are identical so that the description of one unit will suffice for an understanding of the system.

In the preferred embodiment illustrated herein, each pair of cooperating cylinders consists of an outer and an inner cylinder telescopingly interconnected for gliding movement in relation to each other under the pressure of hydraulic fluid in a respective one of the operating chambers of the cylinders. Cylinder pair Z is comprised of inner cylinder Z1 and outer cylinder Z1.1; cylinder pair Z' is comprised of inner cylinder Z2 and outer cylinder Z2.1; and cylinder pair Z'' is comprised of inner cylinder Z3 and outer cylinder Z3.1. Each of the cylinders has an annular wall and a bottom wall at one end of the annular wall. Annular wall M1 of the inner cylinder of each pair has a peripheral surface in fluid-tight gliding contact with the inner surface of annular wall M1.1 of the outer cylinder of each pair. Bottom 3 of the outer cylinder carries cylindrical block 4 projecting into the open end of the inner cylinder. Cylindrical block 4 has a peripheral surface in fluid-tight gliding contact with the inner surface of the annular wall of the inner cylinder. Annular wall M1 of the inner cylinder constitutes a piston of the outer cylinder and cylindrical block 4 of the outer cylinder constitutes a piston of the inner cylinder. Annular wall M1 of the inner cylinder and cylindrical block 4 respectively have annular pressure face D1 and circular pressure face D1.1. Pressure faces D1 and D1.1 have substantially the same area and each pressure face delimits a fluid-tight operating chamber in the respective cylinder.

A separate hydraulic fluid delivery conduit 1 and 2, 1.2 and 2.2, 1.3 and 2.3, is connected to the operating chamber of each cylinder Z1.1 and Z1, Z2.1 and Z2, and Z3.1 and Z3. Shut-off valve V1 is mounted in one conduit and shut-off valve V2 is mounted in the other conduit for selectively discontinuing hydraulic fluid delivery to the operating chambers and permitting hydraulic fluid delivery thereto.

In the illustrated embodiment, each unit of assembled pairs of cooperating cylinders comprises a common manifold S interconnecting hydraulic fluid conduits 1, 1.2 and 1.3, and a common manifold S1 interconnecting hydraulic fluid conduits 2, 2.2 and 2.3 connected to respective ones of the operating chambers of each cylinder of pairs Z, Z' and Z''. The manifolds lead to connecting conduit ZL, in which valves V1 and V2 are mounted, and the connecting conduit leads to main conduit 04 connected to a source of hydraulic fluid (not shown). The valves do not adjust the flow of hydraulic fluid but serve merely to fill and empty the operating chamber, i.e. to supply pressure to the pressure faces in the cylinders or to relieve them of pressure. Valve V2 in conduit 2, 2.2 and 2.3 is mounted between the connection of manifold S1 to connecting conduit Z1 and the connection of manifold S to this connecting conduit.

In the illustrated hydraulic fluid circuit, valves V1 and V2 may be opened and closed separately and independently of each other. When the damper system is in operation, for example while the trailer truck moves along the road, no hydraulic fluid pump is required in the closed hydraulic fluid circuit since no fluid is lost. Therefore, it is necessary to be able to close the circuit to each axle system independently, which may be done by the independent operation of separate valves V1 and V2. On the other hand, all the cylinders of the entire damper system may be fed from a single oil sump, which makes the system exceedingly economical.

As shown, each separate hydraulic fluid delivery conduit has its own manometer 10 to monitor the hydraulic fluid pressure therein.

The operation of the support and safety arrangement for the hydraulic damper system will partly be obvious from the above description of its structure and will be more fully explained hereinafter.

When it is desired to execute a lifting stroke by moving the cooperating cylinders apart to raise the trailer supported on the damper system, valves V1 and V2 are opened so as to permit a desired amount of hydraulic fluid to be delivered into the operating chambers of these cylinders. Upon completion of the desired lifting stroke, the valves are closed. This keeps the metered amount of hydraulic fluid locked in the cylinder chambers and securely maintains the trailer at the desired level. After the damper systems of all axle systems have been thus adjusted, the trailer truck is ready for movement.

Assuming a conduit in the damper system at axle system I breaks or there is some leakage in this damper system and the conduit to inner cylinders Z1, Z2 and Z3 leaks, the pressure in the circuit of outer cylinders Z1.1, Z2.1 and Z3.1 will rise so that the outer cylinders take over the entire load of the axles. The same would occur in case of a leakage in the other circuit, in which case the circuit of the inner cylinders takes over the full load by increase of the pressure. Any pressure reduction or increase is indicated by manometer 10.

When the damper system is to be returned into its rest position, valves V1 and V2 are opened simultaneously or sequentially so as to empty the cylinder chambers.

What is claimed is:

1. A support and safety arrangement for a hydraulic damper system supporting a trailer on a wheel axle at one end thereof, comprising a unit of pairs of cooperating cylinders, each cylinder having a piston with a pressure face, the pressure faces of the pistons of the cylinders of each pair having substantially the same area and each pressure face delimiting an operating chamber in the respective cylinder, the operating chambers of the cylinders of each pair being separated from each other in a fluid-tight manner, two separate conduits each containing a metered amount of hydraulic fluid, each conduit connecting the operating chambers of the respective cylinders, and a shut-off valve in each conduit for selectively permitting delivery of the metered amounts of hydraulic fluid to each separate conduit and for discontinuing the hydraulic fluid delivery and locking the metered amounts of hydraulic fluid in each conduit.

2. The arrangement of claim 1, wherein the cooperating cylinders are an outer and an inner cylinder telescopingly interconnected for gliding movement in relation to each other under the pressure of the hydraulic fluid in a respective one of the operating chambers, each of the cylinders having an annular wall and a bottom wall at one end of the annular wall, the other annular wall end being open, the annular wall of the inner cylinder having a peripheral surface in fluid-tight gliding contact with the inner surface of the annular wall of the outer cylinder, the bottom of the outer cylinder carrying a cylindrical block projecting into the open end of the inner cylinder, the cylindrical block having a peripheral surface in fluid-tight gliding contact with the inner surface of the annular wall of the inner cylinder, the annular wall of the inner cylinder constituting the piston of the outer cylinder and the cylindrical block constituting the piston of the inner cylinder, and the annular wall of the inner cylinder and the cylindrical block having respective annular and circular end faces constituting the pressure faces.

3. The support and safety arrangement for the hydraulic damper system of claim 2 or 1 wherein each conduit comprises a common manifold interconnecting branch conduits leading from the manifold to respective ones of the operating chambers.

* * * * *